United States Patent
Neelam et al.

(10) Patent No.: US 11,032,093 B2
(45) Date of Patent: Jun. 8, 2021

(54) MULTICAST GROUP MEMBERSHIP MANAGEMENT

(71) Applicant: Juniper Networks, Inc., Sunnyvale, CA (US)

(72) Inventors: Sairam Neelam, Hyderabad (IN); Amit Kumar Rao, Ottawa (CA)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 16/514,822

(22) Filed: Jul. 17, 2019

(65) Prior Publication Data

US 2021/0021438 A1 Jan. 21, 2021

(51) Int. Cl.
*G06F 15/16* (2006.01)
*H04L 12/18* (2006.01)

(52) U.S. Cl.
CPC .................. *H04L 12/185* (2013.01)

(58) Field of Classification Search
CPC .................................... H04L 12/185
USPC ......................... 709/202–206, 245
See application file for complete search history.

(56) References Cited

U.S. PATENT DOCUMENTS

| | | | | |
|---|---|---|---|---|
| 7,590,749 | B2* | 9/2009 | Lu ................. | H04L 12/185 709/238 |
| 9,083,539 | B2* | 7/2015 | Riddoch ............. | H04L 12/18 |
| 9,521,458 | B2* | 12/2016 | Shah ................ | H04L 12/185 |
| 2002/0150094 | A1 | 10/2002 | Cheng et al. | |
| 2004/0148421 | A1 | 7/2004 | Achtermann et al. | |
| 2014/0229529 | A1* | 8/2014 | Barone ............. | H04L 65/103 709/203 |
| 2014/0317271 | A1 | 10/2014 | Kim et al. | |
| 2014/0369251 | A1* | 12/2014 | Zhang .............. | H04L 12/185 370/312 |
| 2020/0021479 | A1* | 1/2020 | Rao ................. | H04L 41/0206 |
| 2020/0044957 | A1* | 2/2020 | Allan .............. | H04L 12/185 |

FOREIGN PATENT DOCUMENTS

WO    2019108548 A1    6/2019

OTHER PUBLICATIONS

Extended European Search Report for Application No. EP19199156. 1, dated Feb. 17, 2020, 9 pages.

* cited by examiner

*Primary Examiner* — Bharat Barot
(74) *Attorney, Agent, or Firm* — Harrity & Harrity, LLP

(57) ABSTRACT

A network device may intercept, from an application associated with a user space of the network device, a request message to join a multicast group or to leave the multicast group. The request message may be addressed to a kernel of the network device. The network device may direct the request message to a service daemon associated with the user space of the network device. The network device may determine, using the service daemon, whether another application associated with the user space is a member of the multicast group. The network device may selectively generate, using the service daemon and based on whether the other application associated with the user space is the member of the multicast group, an advertisement message based on the request message, and transmit the advertisement message when the advertisement message is generated.

20 Claims, 7 Drawing Sheets

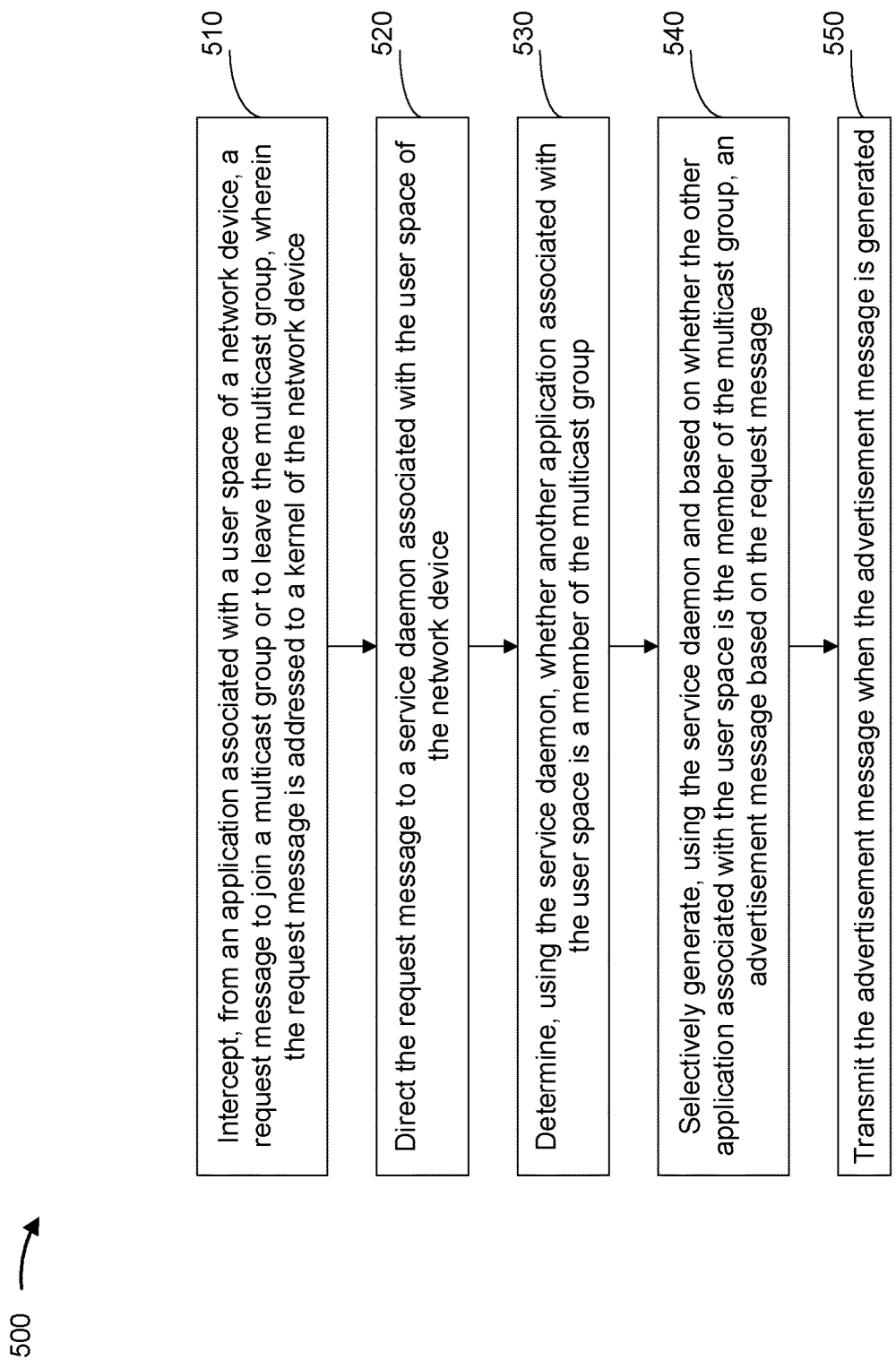

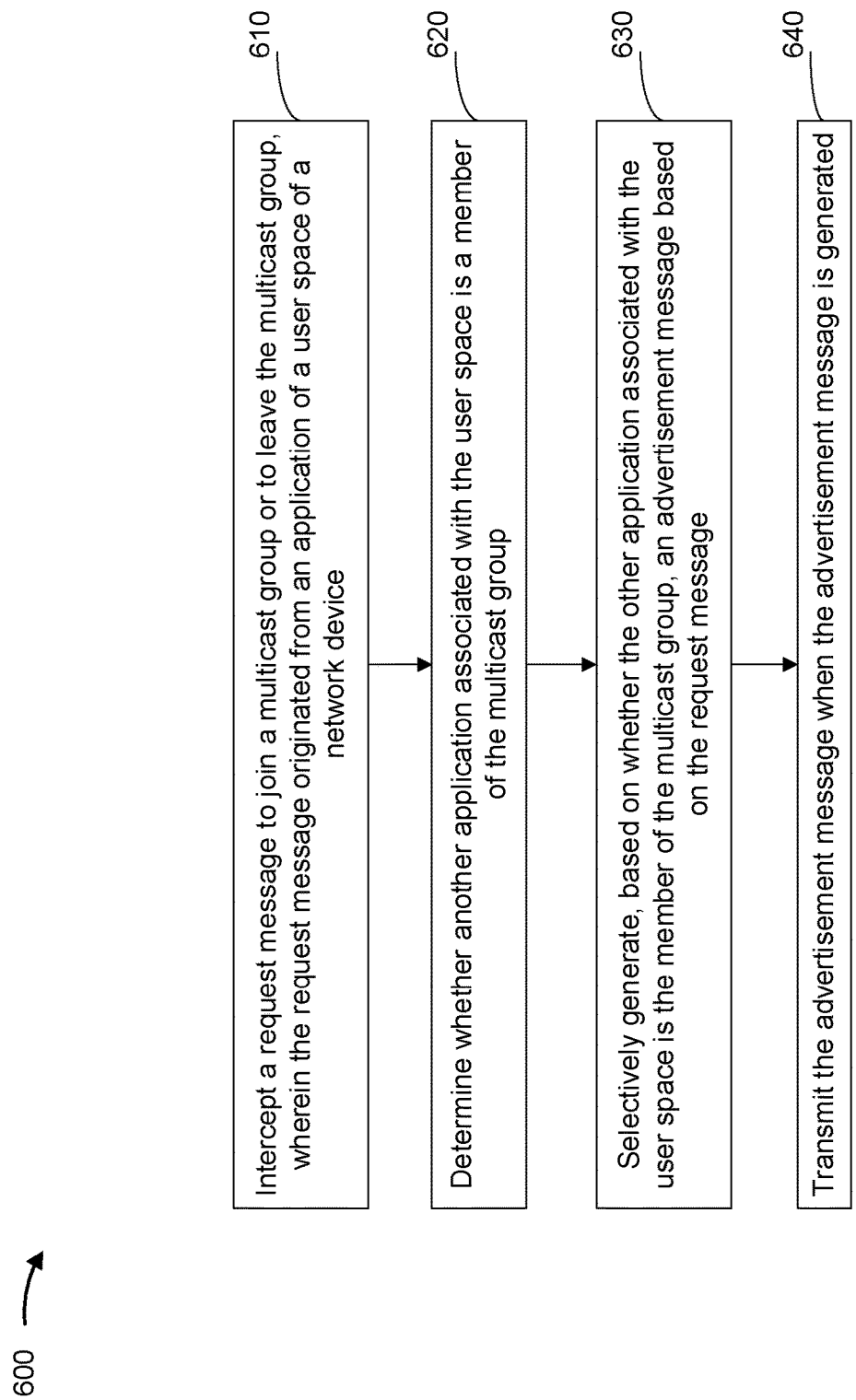

MULTICAST GROUP MEMBERSHIP MANAGEMENT

BACKGROUND

In computer networking, multicasting is a group communication where data transmission is addressed to a group of destination computers simultaneously. Multicasting can be a one-to-many or a many-to-many distribution.

SUMMARY

According to some implementations, a method may include detecting, by a network device and from an application associated with a user space of the network device, a request message to join a multicast group or to leave the multicast group, wherein the request message is addressed to a kernel of the network device; readdressing, by the network device, the request message to a service daemon of the network device, wherein the service daemon is associated with the user space of the network device; directing, by the network device, the request message to the service daemon based on readdressing the request message; selectively generating, by the network device and using the service daemon, an advertisement message based on the request message, wherein the advertisement message is to be generated if there are no other applications associated with the user space that are members of the multicast group, and wherein the advertisement message is not to be generated if there is at least one other application associated with the user space that is a member of the multicast group; and transmitting, by the network device, the advertisement message when the advertisement message is generated.

According to some implementations, a network device may include one or more memories, and one or more processors to intercept, from an application associated with a user space of the network device, a request message to join a multicast group or to leave the multicast group, wherein the request message is addressed to a kernel of the network device; direct the request message to a service daemon associated with the user space of the network device; determine, using the service daemon, whether another application associated with the user space is a member of the multicast group; selectively generate, using the service daemon and based on whether the other application associated with the user space is the member of the multicast group, an advertisement message based on the request message; and transmit the advertisement message when the advertisement message is generated.

According to some implementations, a non-transitory computer-readable medium may store one or more instructions that, when executed by one or more processors, may cause the one or more processors to intercept a request message to join a multicast group or to leave the multicast group, wherein the request message originated from an application of a user space of a network device; determine whether another application associated with the user space is a member of the multicast group; selectively generate, based on whether the other application associated with the user space is the member of the multicast group, an advertisement message based on the request message; and transmit the advertisement message when the advertisement message is generated.

BRIEF DESCRIPTION OF THE DRAWINGS

FIGS. 4-6 are flowcharts of example processes for multicast group membership management.

DETAILED DESCRIPTION

The following detailed description of example implementations refers to the accompanying drawings. The same reference numbers in different drawings may identify the same or similar elements.

In a network device, a socket may be used to transfer information between a kernel and a user space process, such as an application operating on the network device. For example, the application of the network device may provide requests to the kernel using a socket. As an example, the application may provide, to the kernel, a request to join or leave a multicast group. The kernel may process the request and provide the requested multicast support according to a network state maintained by the kernel. However, in some cases, the network state may be distributed such that multiple network devices (e.g., nodes of a network) maintain at least a portion of the network state. In this case, when the network state is distributed to multiple network devices, the application of the network device may generate a request to join or leave a multicast group, and the request may fail as a result of the kernel not storing information relating to the network state. As a result, the application may be prevented from operating on the network device, thereby reducing usability of the network device, negatively impacting utilization of a network that includes the network device, and/or the like. Moreover, customizing each application for deployment on the network device may require excessive computing resources for application modification, application testing, and/or the like.

According to some implementations described herein, a network device may provide multicast group membership management using a user space process. In some implementations, the network device may monitor for and detect a request to join or leave a multicast group that is directed to a kernel of the network device, may intercept the request, and may modify the request to enable the request to be successfully fulfilled using a user space service daemon of the network device. In this way, the network device enables utilization of applications that require multicast support, thereby improving functionality of the network device, improving functionality of a network that includes the network device, reducing a processing utilization relating to processing failed requests, and/or the like. Moreover, the network device enables implementation of applications requiring multicast support without application customization, thereby reducing processing utilization, memory utilization, and/or the like associated with generating multiple versions of custom applications, storing multiple versions of custom applications, and/or the like.

Figure 1:
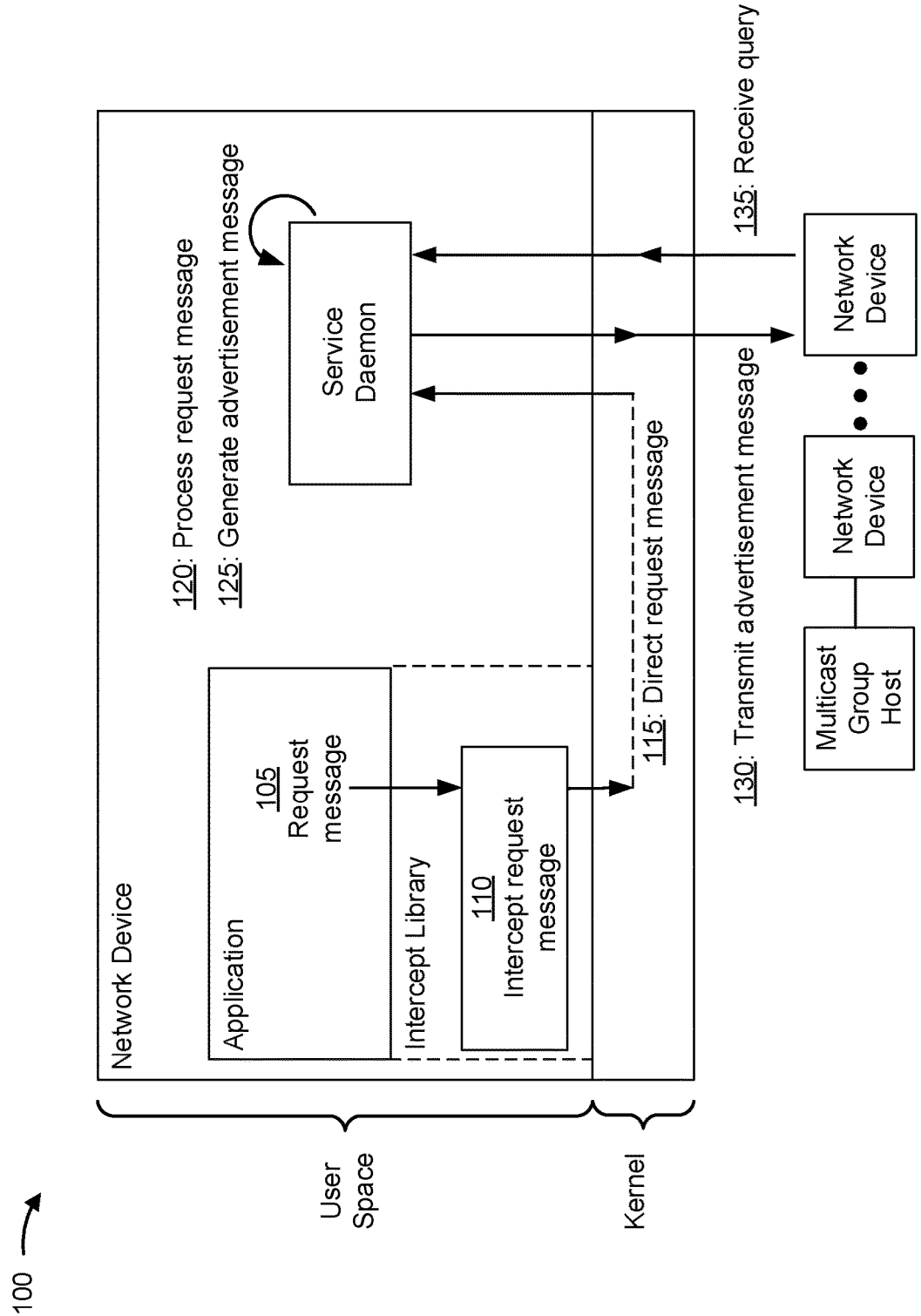
FIG. 1 is a diagram of an example implementation described herein.

FIG. 1 is a diagram of an example implementation 100 described herein. As shown in FIG. 1, example implementation 100 may include a set of network devices and a multicast group host. As further shown in FIG. 1, a network device may include an application (e.g., a third-party application), an intercept library, and a service daemon associated with a user space of the network device. The network device may be a multicast host that consumes (i.e., does not route) multicast traffic transmitted from another multicast host (e.g., the multicast group host). The network device may consume the multicast traffic using the application. Accordingly, the application may be a multicast application used for video conferencing, gaming, streaming video, distance learning, and/or the like.

As shown in FIG. 1, and by reference number 105, the application of the network device may send a request (e.g., a multicast request) to join a multicast group or to leave a multicast group. For example, the application, which may be operating in the user space of the network device, may open a socket and generate a socket system call (e.g., "setsockopt( )"). The socket system call may relate to joining a multicast group (e.g., "setsockopt( )" using an "IP_ADD_MEMBERSHIP" option or an "IPV6_ADD_MEMBERSHIP" option), or may relate to leaving a multicast group (e.g., "setsockopt( ) using an "IP_DROP_MEMBERSHIP" or an "IPV6_DROP_MEMBERSHIP" option). In some implementations, the application may set a particular destination address for the request. For example, the application may set a socket identifier in a destination socket address of the request to a socket address in the kernel to attempt to join or leave a multicast group.

In some implementations, the request is to join a multicast group, and the request (e.g., the socket system call) may identify a particular multicast group that is to be joined and a particular interface of the network device on which the application is to receive multicast traffic of the particular multicast group. Additionally, or alternatively, the request may be to leave a multicast group, and the request (e.g., the socket system call) may identify a particular multicast group that is to be left and a particular interface of the network device on which the application is to stop receiving multicast traffic of the particular multicast group.

As shown by reference number 110, the network device may intercept the request of the application. For example, the network device may detect the request, intercept the request, and alter (e.g., readdress) the request. In such a case, the network device may implement the intercept library, which may include one or more functions to detect the request, intercept the request, and alter the request. The network device may load (e.g., preload) the intercept library at a run time of the application. For example, at a run time of the application, the network device may load the intercept library before loading a default library of the application. In this way, a revised definition for the request provided in the intercept library will replace a default definition for the request provided in the default library, such that requests will be processed according to the revised definition of the intercept library.

In some implementations, the network device may use the intercept library to detect the request and readdress the request. For example, the network device may use the intercept library to alter a socket identifier of the request. As an example, the network device may use the intercept library to readdress the request to a destination socket address associated with the service daemon. In this way, the network device causes a kernel of the network device to not process the request, and directs the request to the service daemon, thereby avoiding the request failing.

As shown by reference number 115, the network device may direct the request to the service daemon. For example, based on the network device using the intercept library to intercept and readdress the request, the network device may direct the request to the service daemon. In some implementations, the network device, when directing the request to the service daemon, may identify information associated with the request (e.g., a particular multicast group and a particular interface of the request) and provide the information to the service daemon.

The network device, using the intercept library, may direct the request to the service daemon via a control channel (e.g., a Unix domain socket) with the service daemon. In some implementations, the service daemon may be implemented on another device (e.g., another network device, a server device, and/or the like), and the network device, using the intercept library, may direct the request to the other device via a communication protocol (e.g., Transmission Control Protocol (TCP)).

As shown by reference number 120, the network device may process the request to join or leave a multicast group. For example, the network device, using the service daemon, may receive the request and process the request to identify a particular multicast group of the request, a particular interface of the request, and whether the request is to join the particular multicast group on the particular interface or to leave the particular multicast group on the particular interface.

The network device, using the service daemon, may maintain (e.g., in a data structure) multicast state information (e.g., the service daemon may implement a multicast state machine). In such a case, the service daemon may store a state of multicast group membership for applications associated with the user space of the network device. For example, the service daemon may track a count relating to a quantity of applications associated with the user space that are members of (i.e., that have joined) a particular multicast group on a particular interface.

Accordingly, based on identifying that the request is to join a particular multicast group on a particular interface, the service daemon may increment the count associated with the particular multicast group on the particular interface. Similarly, based on identifying that the request is to leave a particular multicast group on a particular interface, the service daemon may decrement the count associated with the particular multicast group on the particular interface. In this way, the network device (e.g., using the service daemon) stores a state of the particular multicast group on the particular interface.

In some implementations, the network device, using the intercept library, may monitor sockets (e.g., IPv4 or IPv6 sockets) opened by the application for traffic relating to a particular multicast group on a particular interface. Furthermore, the network device, using the intercept library, may determine whether a socket opened by the application was closed without a corresponding request to leave the particular multicast group on the particular interface. For example, the socket may close without a corresponding request to leave when the application crashes. The network device, using the intercept library, may provide information relating to the closed socket (e.g., the particular multicast group and the particular interface that was associated with the closed socket) to the service daemon, and the service daemon may decrement a counter associated with the particular multicast group on the particular interface based on receiving the information.

As shown by reference number 125, the network device, using the service daemon, may selectively generate an advertisement (e.g., a multicast advertisement). For example, the service daemon may generate the advertisement based on the request (e.g., based on whether the request is to join or to leave a multicast group). In some cases, the service daemon may generate the advertisement when there are no other applications associated with the user space that are members of the particular multicast group on the particular interface identified in the request. Similarly, the service daemon may not generate the advertisement when there is at least one other application associated with the user space that is a member of the particular multicast group on the particular interface identified in the request.

Accordingly, the service daemon may determine a quantity of applications associated with the user space that are members of the particular multicast group on the particular interface according to state information, stored by the service daemon, relating to membership of the particular multicast group on the particular interface, as described above. For example, the service daemon may obtain (e.g., from a data structure) a count relating to the quantity of applications associated with the user space that are members of the particular multicast group on the particular interface, as described above.

In this case, the service daemon may determine whether to generate the advertisement based on the count. For example, if the request is to join a multicast group on an interface, and the count for the multicast group on the interface is 1 (i.e., the count was incremented to 1 based on the request to join), the service daemon may determine to generate the join advertisement. In this way, the service daemon generates the join advertisement for the first application, associated with the user space, that requests to join the multicast group on the interface. Conversely, if the request is to join a multicast group on an interface, and the count for the multicast group on the interface is greater than 1 (i.e., the count was incremented to 2 or greater based on the request to join), the service daemon may determine not to generate the join advertisement. In this way, the service daemon does not generate the join advertisement when a join advertisement relating to the multicast group on the interface has already been sent, thereby conserving processing resources and network resources that would otherwise be used processing duplicate advertisements.

As another example, if the request is to leave a multicast group on an interface, and the count for the multicast group on the interface is 0 (i.e., the count was decremented to 0 based on the request to leave), the service daemon may determine to generate the leave advertisement. In this way, the service daemon generates the leave advertisement for the last application, associated with the user space, that requests to leave the multicast group on the interface. Conversely, if the request is to leave a multicast group on an interface, and the count for the multicast group on the interface is greater than 0 (i.e., the count was decremented to 1 or greater based on the request to leave), the service daemon may determine not to generate the leave advertisement. In this way, the service daemon does not generate the leave advertisement so long as at least one application, associated with the user space, is interested in the multicast group on the interface, thereby conserving processing resources and network resources that would otherwise be used processing join and leave advertisements each time an application requests to join and leave the multicast group on the interface.

Based on determining to generate an advertisement (e.g., a join advertisement or a leave advertisement), the network device, using the service daemon, may generate the advertisement according to a multicast protocol. For example, the network device, using the service daemon, may generate the advertisement according to Internet Group Management Protocol (IGMP) (e.g., for an IPv4 network) or Multicast Listener Discovery (MLD) (e.g., for an IPv6 network). The advertisement may identify an address associated with the multicast group identified in the request.

In addition, the advertisement may identify an address associated with routing the advertisement to a multicast host associated with the multicast group. Accordingly, the service daemon may store (e.g., in a data structure) network state information relating to a network that includes the network device. For example, the network device, using the service daemon, may request network state information from one or more other network devices, and may receive response messages identifying portions of the network state from the one or more other network devices. In this way, the service daemon may store network state information, when the network state information is not stored in the kernel, to enable forwarding of multicast advertisements that otherwise would not be possible in a distributed architecture.

In addition to generating the advertisement, the service daemon may also cause a network stack of the network device to be configured according to the advertisement. For example, if the advertisement is to join a particular multicast group on a particular interface, the service daemon may cause the network stack of the network device (e.g., a line card and/or a kernel stack for routing) to be configured to accept multicast traffic from the particular multicast group on the particular interface. As another example, if the advertisement is to leave a particular multicast group on a particular interface, the service daemon may cause a prior configuration of the network stack of the network device (e.g., a line card and/or a kernel stack for routing) to accept multicast traffic from the particular multicast group on the particular interface to be withdrawn.

The network device, using the service daemon, may provide the advertisement to the kernel of the network device. For example, the service daemon may provide the advertisement to the kernel via a socket.

As shown by reference number 130, the network device may transmit the advertisement (e.g., the multicast advertisement). For example, the network device, using the kernel (e.g., the kernel's stack for routing) may transmit the advertisement on the particular interface identified in the request. The device may transmit the advertisement to one or more other network devices in a network that includes the network device. In this way, the advertisement permits the one or more other network devices to identify that multicast traffic relating to the multicast group identified in the request is to be routed to the particular interface of the network device. Accordingly, the application that generated the request may begin to receive multicast traffic for the multicast group identified in the request.

As shown by reference number 135, the network device may receive a query (e.g., a multicast query) from another network device. The network device may receive the query on a particular interface of the network device. The query may request information relating to which multicast groups are of interest to the network device, information relating to whether a particular multicast group is of interest to the network device, and/or the like. In such a case, the network device may provide the query to the service daemon (e.g., via a socket with the kernel), and the service daemon may determine a response to the query. In some implementations, the service daemon may determine a response to the query based on a state of multicast group membership on the particular interface, that is stored by the service daemon. For example, the service daemon may retrieve counts associated with one or more multicast groups on the particular interface, in accordance with a nature of the query, and generate a response to the query based on the retrieved counts. In some implementations, the response to the query may be the advertisement. The network device may transmit the response to the request in a manner similar to that described above in connection with transmitting advertisements.

In this way, the network device enables user space applications of the network device to join or leave multicast groups when network state information is not stored in the kernel of network device, thereby improving functioning of the network device, a network that includes the network device, and/or the like. Moreover, based on enabling applications that use multicast traffic to operate on the network device without customization as to where network state information is actually stored (e.g., the user space or in a distributed architecture), the network device reduces a utilization of processing resources to customize applications, a utilization of memory resources to store multiple customized versions of an application, and/or the like.

As indicated above, FIG. 1 is provided merely as an example. Other examples may differ from what is described with regard to FIG. 1.

Figure 2:
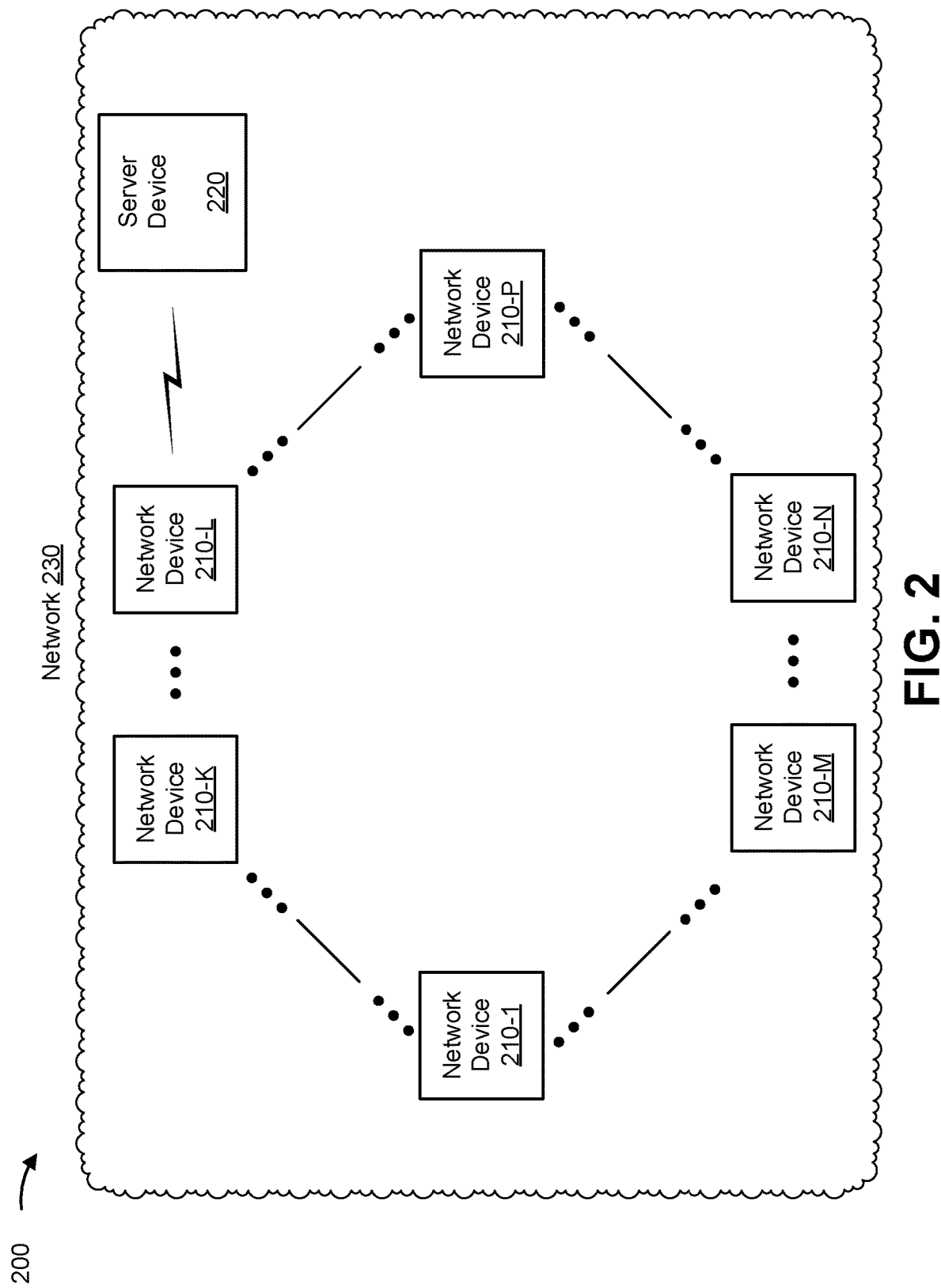
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include one or more network devices 210-1 through 210-P (P≥1) (hereinafter referred to collectively as "network devices 210," and individually as "network device 210"), a server device 220, and a network 230. Devices of environment 200 may interconnect via wired connections, wireless connections, or a combination of wired and wireless connections.

Network device 210 includes one or more devices (e.g., one or more traffic transfer devices) capable of processing and/or transferring traffic between endpoint devices. For example, network device 210 may include a firewall, a router, a gateway, a switch device, a hub, a bridge, a reverse proxy, a server (e.g., a proxy server), a top of rack (ToR) switch, a load balancer, a switch interface board, a controller, a switching element, a packet processing component, or a similar device. In some implementations, network device 210 may include a user space and a kernel. In some implementations, network device 210 may store network state information and/or multicast state information in the user space. In some implementations, network device 210 may not store network state information and/or multicast state information in a kernel (e.g., a Linux kernel). In some implementations, network devices 210 may form a distributed architecture, such that a first network device 210 stores a first portion of network state information and a second network device 210 stores a second portion of network state information. In some implementations, network device 210 may be a multicast host that receives multicast traffic for one or more multicast groups. In some implementations, network device 210 may be a physical device implemented within a housing, such as a chassis. In some implementations, network device 210 may be a virtual device implemented by one or more computer devices of a cloud computing environment or a data center.

Server device 220 includes one or more devices capable of storing, processing, and/or routing information associated with routing network traffic. For example, server device 220 may include a server that includes computing resources that may be utilized in connection with traffic routing. In some implementations, server device 220 may include a communication interface that allows server device 220 to receive information from and/or transmit information to other devices in environment 200. In some implementations, server device 220 may be a multicast host that is a source of multicast traffic for one or more multicast groups.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a communications network, a telecommunications network, a private network, an ad hoc network, an intranet, the Internet, a fiber optic-based network, a cloud computing network, or the like, and/or a combination of these or other types of networks.

In some implementations, network device 210 and/or server device 220 may be a virtual device implemented by one or more computing devices of a cloud computing environment or a data center.

The quantity and arrangement of devices shown in FIG. 2 are provided as an example. In practice, there may be additional devices, fewer devices, different devices and/or networks, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
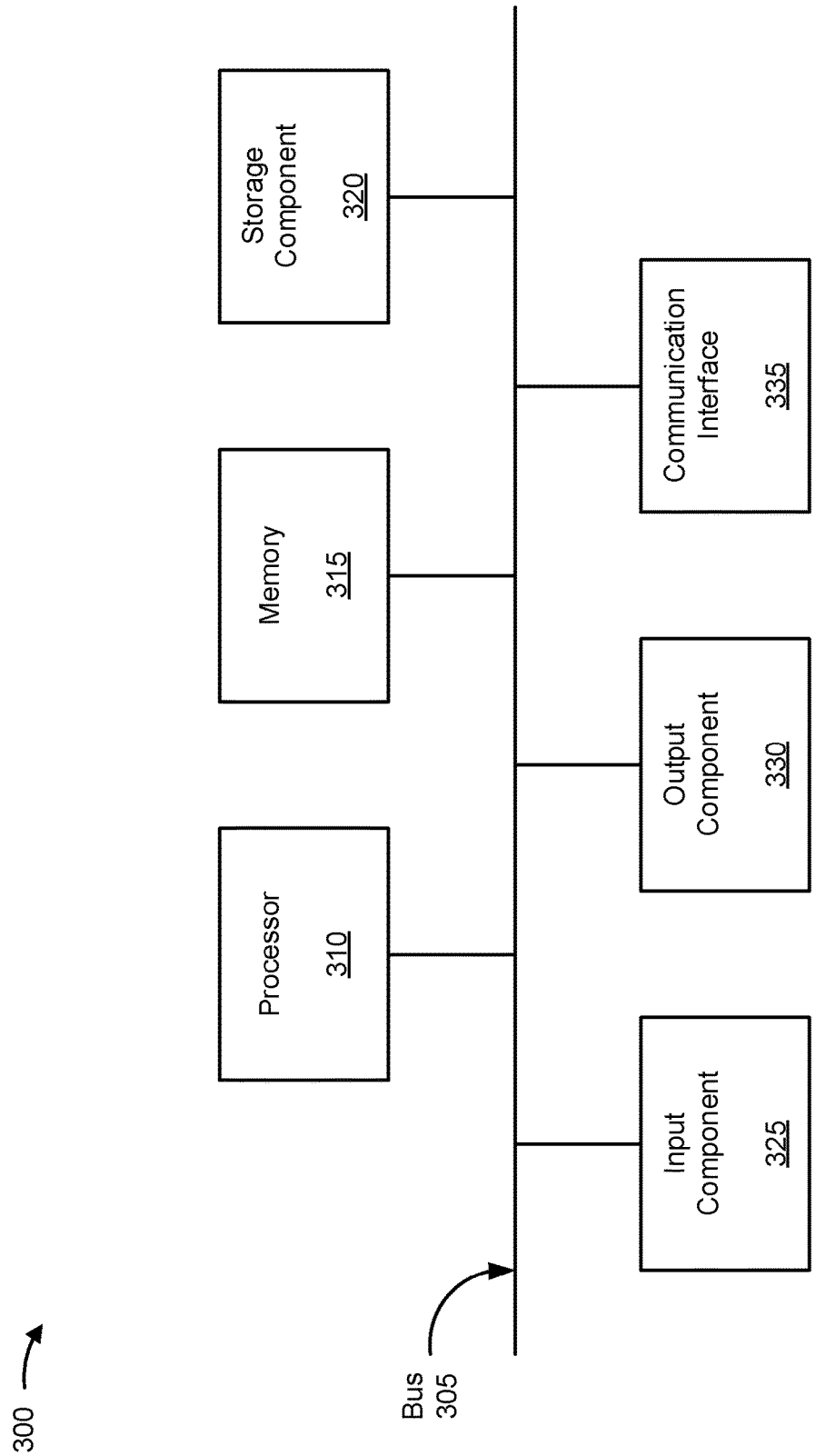
FIGS. 3A and 3B are diagrams of example components of one or more devices of FIG. 2.
Figure 3B:
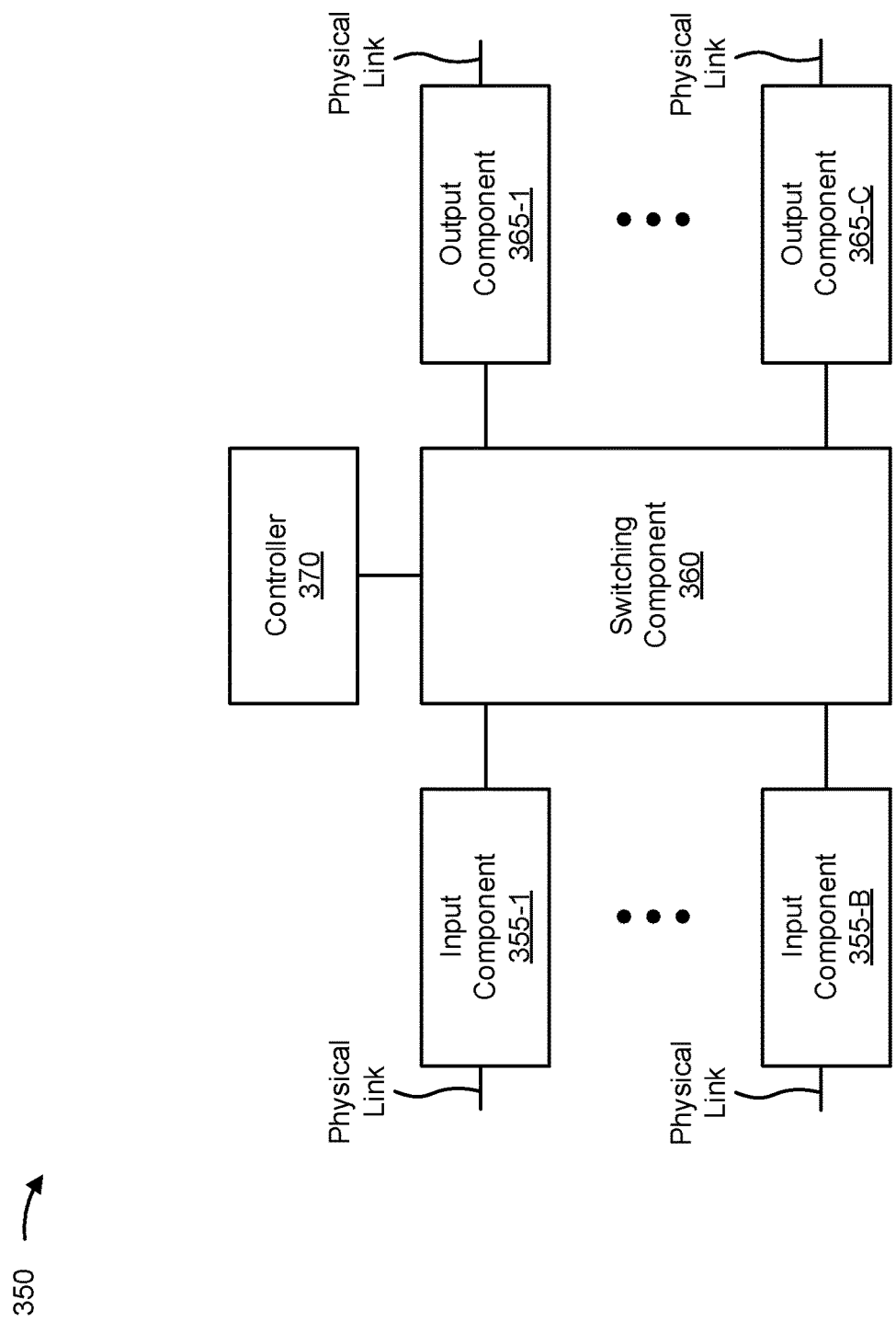

FIGS. 3A and 3B are diagrams of example components of one or more devices of FIG. 2. FIG. 3A is a diagram of example components of a device 300. Device 300 may correspond to network device 210 and/or server device 220. In some implementations, network device 210 and/or server device 220 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to network device 210. In some implementations, network device 210 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
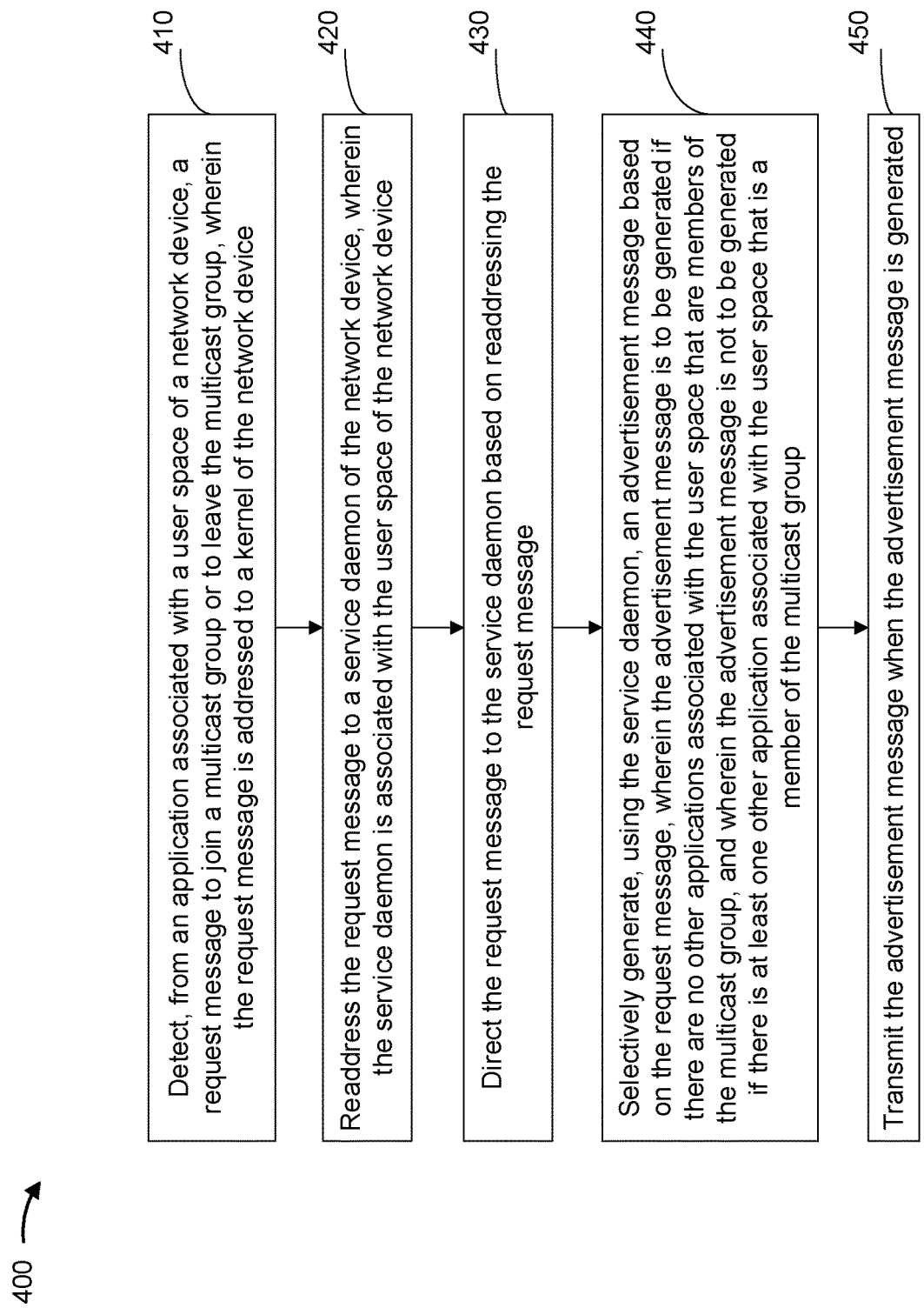

FIG. 4 is a flow chart of an example process 400 for multicast group membership management. In some implementations, one or more process blocks of FIG. 4 may be performed by a network device (e.g., network device 210). In some implementations, one or more process blocks of FIG. 4 may be performed by another device or a group of devices separate from or including the network device, such as a server device (e.g. server device 220), or the like.

As shown in FIG. 4, process 400 may include detecting, from an application associated with a user space of a network device, a request message to join a multicast group or to leave the multicast group, wherein the request message is addressed to a kernel of the network device (block 410). For example, the network device (e.g., using processor 310, memory 315, storage component 320, controller 370, and/or the like) may detect, from an application associated with a user space of a network device, a request message to join a multicast group or to leave the multicast group, as described above. In some implementations, the request message is addressed to a kernel of the network device.

As further shown in FIG. 4, process 400 may include readdressing the request message to a service daemon of the network device, wherein the service daemon is associated with the user space of the network device (block 420). For example, the network device (e.g., using processor 310, memory 315, storage component 320, controller 370, and/or the like) may readdress the request message to a service daemon of the network device, as described above. In some implementations, the service daemon is associated with the user space of the network device.

As further shown in FIG. 4, process 400 may include directing the request message to the service daemon based on readdressing the request message (block 430). For example, the network device (e.g., using processor 310, memory 315, storage component 320, controller 370, and/or the like) may direct the request message to the service daemon based on readdressing the request message, as described above.

As further shown in FIG. 4, process 400 may include selectively generating, using the service daemon, an advertisement message based on the request message, wherein the advertisement message is to be generated if there are no other applications associated with the user space that are members of the multicast group, and wherein the advertisement message is not to be generated if there is at least one other application associated with the user space that is a member of the multicast group (block 440). For example, the network device (e.g., using processor 310, memory 315, storage component 320, controller 370, and/or the like) may selectively generate, using the service daemon, an advertisement message based on the request message, as described above. In some implementations, the advertisement message is to be generated if there are no other applications associated with the user space that are members of the multicast group. In some implementations, the advertisement message is not to be generated if there is at least one other application associated with the user space that is a member of the multicast group.

As further shown in FIG. 4, process 400 may include transmitting the advertisement message when the advertisement message is generated (block 450). For example, the network device (e.g., using processor 310, memory 315, storage component 320, output component 330, communication interface 335, output component 365, controller 370, and/or the like) may transmit the advertisement message when the advertisement message is generated, as described above.

Process 400 may include additional implementations, such as any single implementation or any combination of implementations described below and/or in connection with one or more other processes described elsewhere herein.

In a first implementation, readdressing the request message comprises setting a destination socket address of the request message to a socket identifier of a socket of the service daemon, and directing the request message to the service daemon comprises directing the request message to the service daemon using the socket identifier of the socket of the service daemon.

In a second implementation, alone or in combination with the first implementation, the advertisement message relates to joining the multicast group, and process 400 further comprises configuring, based on generating the advertisement message, a network stack of the network device to accept multicast traffic associated with the multicast group. In a third implementation, alone or in combination with one or more of the first and second implementations, the advertisement message relates to leaving the multicast group, and process 400 further comprises configuring, based on generating the advertisement message, a network stack of the network device to not accept multicast traffic associated with the multicast group.

In a fourth implementation, alone or in combination with one or more of the first through third implementations, the service daemon stores a state of membership of the multicast group for one or more applications associated with the user space of the network device. In a fifth implementation, alone or in combination with one or more of the first through fourth implementations, the request message is a socket system call. In a sixth implementation, alone or in combination with one or more of the first through fifth implementations, the request message identifies the multicast group and an interface of the network device that is to receive multicast traffic of the multicast group.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for multicast group membership management. In some implementations, one or more process blocks of FIG. 5 may be performed by a network device (e.g., network device 210). In some implementations, one or more process blocks of FIG. 5 may be performed by another device or a group of devices separate from or including the network device, such as a server device (e.g. server device 220), or the like.

As shown in FIG. 5, process 500 may include intercepting, from an application associated with a user space of a network device, a request message to join a multicast group or to leave the multicast group, wherein the request message is addressed to a kernel of the network device (block 510). For example, the network device (e.g., using processor 310, memory 315, storage component 320, controller 370, and/or the like) may intercept, from an application associated with a user space of the network device, a request message to join a multicast group or to leave the multicast group, as described above. In some implementations, the request message is addressed to a kernel of the network device.

As further shown in FIG. 5, process 500 may include directing the request message to a service daemon associated with the user space of the network device (block 520). For example, the network device (e.g., using processor 310, memory 315, storage component 320, controller 370, and/or the like) may direct the request message to a service daemon associated with the user space of the network device, as described above.

As further shown in FIG. 5, process 500 may include determining, using the service daemon, whether another application associated with the user space is a member of the multicast group (block 530). For example, the network device (e.g., using processor 310, memory 315, storage component 320, controller 370, and/or the like) may determine, using the service daemon, whether another application associated with the user space is a member of the multicast group, as described above.

As further shown in FIG. 5, process 500 may include selectively generating, using the service daemon and based on whether the other application associated with the user space is the member of the multicast group, an advertisement message based on the request message (block 540). For example, the network device (e.g., using processor 310, memory 315, storage component 320, controller 370, and/or the like) may selectively generate, using the service daemon and based on whether the other application associated with the user space is the member of the multicast group, an advertisement message based on the request message, as described above.

As further shown in FIG. 5, process 500 may include transmitting the advertisement message when the advertisement message is generated (block 550). For example, the network device (e.g., using processor 310, memory 315, storage component 320, output component 330, communication interface 335, output component 365, controller 370, and/or the like) may transmit the advertisement message when the advertisement message is generated, as described above.

Process 500 may include additional implementations, such as any single implementation or any combination of implementations described below and/or in connection with one or more other processes described elsewhere herein.

In a first implementation, determining whether the other application associated with the user space is the member of the multicast group comprises determining a quantity of applications associated with the user space that are members of the multicast group according to state information, stored by the service daemon, relating to membership of the multicast group. In a second implementation, alone or in combination with the first implementation, process 500 further comprises incrementing a count relating to a quantity of applications that are members of the multicast group if the request message is to join the multicast group, or decrementing the count relating to the quantity of applications that are members of the multicast group if the request message is to leave the multicast group.

In a third implementation, alone or in combination with one or more of the first and second implementations, process 500 further comprises identifying a disconnection of a socket, used for receiving traffic of the multicast group, opened by the application, and decrementing a count relating to a quantity of applications that are members of the multicast group based on identifying the disconnection of the socket.

In a fourth implementation, alone or in combination with one or more of the first through third implementations, the service daemon stores a count relating to a quantity of applications that are members of the multicast group on a particular interface. In a fifth implementation, alone or in combination with one or more of the first through fourth implementations, the service daemon stores state information relating to a network state of a network that includes the network device. In a sixth implementation, alone or in combination with one or more of the first through fifth implementations, the request message identifies the multicast group and an interface of the network device that is to receive multicast traffic of the multicast group.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for multicast group membership management. In some implementations, one or more process blocks of FIG. 6 may be performed by a network device (e.g., network device 210). In some implementations, one or more process blocks of FIG. 6 may be performed by another device or a group of devices separate from or including the network device, such as a server device (e.g. server device 220), or the like.

As shown in FIG. 6, process 600 may include intercepting a request message to join a multicast group or to leave the multicast group, wherein the request message originated from an application of a user space of a network device (block 610). For example, the network device (e.g., using processor 310, memory 315, storage component 320, controller 370, and/or the like) may intercept a request message to join a multicast group or to leave the multicast, as described above. In some implementations, the request message originated from an application of a user space of the network device.

As further shown in FIG. 6, process 600 may include determining whether another application associated with the user space is a member of the multicast group (block 620). For example, the network device (e.g., using processor 310, memory 315, storage component 320, controller 370, and/or the like) may determine whether another application associated with the user space is a member of the multicast group, as described above.

As further shown in FIG. 6, process 600 may include selectively generating, based on whether the other application associated with the user space is the member of the multicast group, an advertisement message based on the request message (block 630). For example, the network device (e.g., using processor 310, memory 315, storage component 320, controller 370, and/or the like) may selectively generate, based on whether the other application associated with the user space is the member of the multicast group, an advertisement message based on the request message, as described above.

As further shown in FIG. 6, process 600 may include transmitting the advertisement message when the advertisement message is generated (block 640). For example, the network device (e.g., using processor 310, memory 315, storage component 320, output component 330, communication interface 335, output component 365, controller 370, and/or the like) may transmit the advertisement message when the advertisement message is generated, as described above.

Process 600 may include additional implementations, such as any single implementation or any combination of implementations described below and/or in connection with one or more other processes described elsewhere herein.

In a first implementation, the request message is intercepted according to an intercept library of functions to detect the request message, intercept the request message, and alter the request message. In a second implementation, alone or in combination with the first implementation, the request message identifies the multicast group and an interface of the network device that is to receive multicast traffic of the multicast group.

In a third implementation, alone or in combination with one or more of the first and second implementations, determining whether the other application associated with the user space is the member of the multicast group comprises determining whether the other application associated with the user space is the member of the multicast group on a particular interface, based on a count relating to a quantity of applications that are members of the multicast group on the particular interface.

In a fourth implementation, alone or in combination with one or more of the first through third implementations, the advertisement message is generated when there are no other applications associated with the user space that are members of the multicast group. In a fifth implementation, alone or in combination with one or more of the first through fourth implementations, the advertisement message is transmitted to one or more other network devices in a network that includes the network device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for multicast group membership management, comprising:
   detecting, by a network device and from an application associated with a user space of the network device, a request message to join a multicast group or to leave the multicast group,
      wherein the request message is addressed to a kernel of the network device;
   readdressing, by the network device, the request message to a service daemon of the network device,
      wherein the service daemon is associated with the user space of the network device;
   directing, by the network device, the request message to the service daemon based on readdressing the request message;
   determining, by the network device and according to information relating to membership of the multicast group stored by the service daemon, a quantity of applications associated with the user space that are members of the multicast group;
   selectively generating, by the network device, based on the determined quantity of applications, and using the service daemon, an advertisement message based on the request message, wherein the advertisement message is to be generated if there are no other applications associated with the user space that are members of the multicast group, wherein the advertisement message is not to be generated if there is at least one other application associated with the user space that is a member of the multicast group; and transmitting, by the network device, the advertisement message when the advertisement message is generated.

2. The method of claim 1, wherein readdressing the request message comprises:

setting a destination socket address of the request message to a socket identifier of a socket of the service daemon; and wherein directing the request message to the service daemon comprises:

directing the request message to the service daemon using the socket identifier of the socket of the service daemon.

3. The method of claim 1, wherein the advertisement message relates to joining the multicast group, and wherein the method further comprises:

configuring, based on generating the advertisement message, a network stack of the network device to accept multicast traffic associated with the multicast group.

4. The method of claim 1, wherein the advertisement message relates to leaving the multicast group, and wherein the method further comprises:

configuring, based on generating the advertisement message, a network stack of the network device to not accept multicast traffic associated with the multicast group.

5. The method of claim 1, wherein the service daemon stores a state of membership of the multicast group for one or more applications associated with the user space of the network device.

6. The method of claim 1, wherein the request message is a socket system call.

7. The method of claim 1, wherein the request message identifies the multicast group and an interface of the network device that is to receive multicast traffic of the multicast group.

8. The method of claim 1, wherein the advertisement message identifies an address associated with routing the advertisement to a multicast host associated with the multicast group.

9. The method of claim 1, further comprising:

intercepting the request message according to an intercept library of functions that include at least one of detecting the request message, intercepting the request message, and readdressing the request message.

10. A network device for multicast group membership management, comprising:

one or more memories; and
one or more processors to:

intercept, from an application associated with a user space of the network device, a request message to join a multicast group or to leave the multicast group, wherein the request message is addressed to a kernel of the network device;

direct the request message to a service daemon associated with the user space of the network device;

determine, according to information relating to membership of the multicast group stored by the service daemon, a quantity of applications associated with the user space that are members of the multicast group;

determine, based on the determined quantity of applications and using the service daemon, whether another application associated with the user space is a member of the multicast group;

selectively generate, using the service daemon and based on whether the other application associated with the user space is the member of the multicast group, an advertisement message based on the request message; and transmit the advertisement message when the advertisement message is generated.

11. The network device of claim 10, wherein the one or more processors are further to:

increment a count relating to a quantity of applications that are members of the multicast group if the request message is to join the multicast group, or decrement the count relating to the quantity of applications that are members of the multicast group if the request message is to leave the multicast group.

12. The network device of claim 10, wherein the one or more processors are further to:

identify a disconnection of a socket, used for receiving traffic of the multicast group, opened by the application; and decrement a count relating to a quantity of applications that are members of the multicast group based on identifying the disconnection of the socket.

13. The network device of claim 10, wherein the service daemon stores a count relating to a quantity of applications that are members of the multicast group on a particular interface.

14. The network device of claim 10, wherein the service daemon stores state information relating to a network state of a network that includes the network device.

15. The network device of claim 10, wherein the request message identifies the multicast group and an interface of the network device that is to receive multicast traffic of the multicast group.

16. A non-transitory computer-readable medium storing instructions, the instructions comprising:

one or more instructions that, when executed by one or more processors, cause the one or more processors to:

intercept a request message to join a multicast group or to leave the multicast group, wherein the request message originated from an application of a user space of a network device;

determine, according to information relating to membership of the multicast group stored by service daemon, a quantity of applications associated with the user space that are members of the multicast group;

determine, based on the determined quantity of applications, whether another application associated with the user space is a member of the multicast group;

selectively generate, based on whether the other application associated with the user space is the member of the multicast group, an advertisement message based on the request message; and transmit the advertisement message when the advertisement message is generated.

17. The non-transitory computer-readable medium of claim 16, wherein the request message is intercepted according to an intercept library of functions to detect the request message, intercept the request message, and alter the request message.

18. The non-transitory computer-readable medium of claim 16, wherein the request message identifies the multicast group and an interface of the network device that is to receive multicast traffic of the multicast group.

19. The non-transitory computer-readable medium of claim 16, wherein the advertisement message is generated when there are no other applications associated with the user space that are members of the multicast group.

20. The non-transitory computer-readable medium of claim 16, wherein the advertisement message is transmitted to one or more other network devices in a network that includes the network device.

\* \* \* \* \*